(12) United States Patent
Geskin et al.

(10) Patent No.: US 8,931,319 B2
(45) Date of Patent: Jan. 13, 2015

(54) SYSTEM AND METHOD FOR FORMING OF TUBULAR PARTS

(71) Applicant: New Jersey Institute of Technology, Newark, NJ (US)

(72) Inventors: Ernest Samuel Geskin, Florham Park, NJ (US); Krzysztof Kluz, Saddle Brook, NJ (US)

(73) Assignee: New Jersey Institute of Technology, Newark, NJ (US)

( * ) Notice: Subject to any disclaimer, the term of this patent is extended or adjusted under 35 U.S.C. 154(b) by 0 days.

(21) Appl. No.: 13/859,383

(22) Filed: Apr. 9, 2013

(65) Prior Publication Data

US 2013/0220473 A1 Aug. 29, 2013

Related U.S. Application Data

(63) Continuation of application No. 12/905,556, filed on Oct. 15, 2010, now Pat. No. 8,459,078.

(60) Provisional application No. 61/251,997, filed on Oct. 15, 2009, provisional application No. 61/298,662, filed on Jan. 27, 2010.

(51) Int. Cl.
*B21D 26/08* (2006.01)
*F16L 9/22* (2006.01)

(52) U.S. Cl.
CPC . *F16L 9/22* (2013.01); *B21D 26/08* (2013.01); *Y10S 72/706* (2013.01)
USPC .................. 72/56; 72/430; 72/706; 29/421.2

(58) Field of Classification Search
USPC ............ 72/56, 60, 61, 62, 430, 706; 415/115, 415/119
See application file for complete search history.

(56) References Cited

U.S. PATENT DOCUMENTS

| 3,343,794 | A | | 9/1967 | Voitsekhovsky | |
|---|---|---|---|---|---|
| 4,187,709 | A | * | 2/1980 | Legate et al. | 72/56 |
| 4,672,832 | A | * | 6/1987 | Merker | 72/62 |
| 5,267,832 | A | * | 12/1993 | Johnson et al. | 415/115 |
| 8,459,078 | B2 | * | 6/2013 | Geskin et al. | 72/56 |
| 2002/0182059 | A1 | * | 12/2002 | Escure et al. | 415/115 |

OTHER PUBLICATIONS

Atanov G., Geskin E., Kovaliov A., Semko A., Broad Spectrum Powder Water-Cannon, Prikladnaya Hidromechanika, vol. 6 (78). No. 3.—pp. 3-8, (2004).
Atanov, G. A, Gubsky, V. I., Semko, A. N., The Pressure Rise Factor For Powder Hydro-cannon. Proceedings of the 13th International Conference on Jetting Technology (pp. 91-103). Sardinia, Italy: Oct. 29-31, 1996.

(Continued)

*Primary Examiner* — David B Jones
(74) *Attorney, Agent, or Firm* — Timothy X. Gibson, Esq.; Gibson & Dernier LLP

(57) ABSTRACT

Apparatus and methods are disclosed whereby a propellant driven water stream is used in the formation of materials made from high tensile strength alloys. High pressure developed in liquid flowing through a tubular work piece is employed to achieve desired forms. The high pressure results from superposition of compression waves generated in the course of the impact of the liquid by products of propellant combustion.

12 Claims, 14 Drawing Sheets

(56) References Cited

OTHER PUBLICATIONS

Petrenko O., Investigation of Formation and Development of High-Speed Liquid Projectiles. Department of Mechanical Engineering, New Jersey Institute of Technology, PhD Dissertation, (2007).

Petrenko O., Geskin E., Goldenberg B., Samardzic V., Atanov G., Semko A., Kovaliov A., Numerical Modeling of Formation of High-Speed Water Slugs, Transactions of ASME, Journal of Fluid Engineering, vol. 126, Mar. 2004, pp. 206-210, (2004).

Petrenko O., Geskin E., Rusanova O., Semko A., Bitardze T., Application of Numerical Techniques for Optimization of the Water Cannon Design, Proceedings of Waterjet Technology Association Conference, Editor M. Hashish, August, Houston, TX; paper 3A-1, (2005-a).

Petrenko O., Geskin E., Semko A., Mechanics of the Powder Hydro Cannon for Incompressible Fluid, 2005 WJTA American Waterjet Conference, 3B-3, Houston, Texas, Aug. 21-23 (2005-b).

Chermensky, G.P., Experimental Investigation of Reliability of Water Cannons. Proceedings of 3rd International Symposium on Jet Cutting Technology, BHRA Fluid Engineering (pp. H1-1-H1-14). Chicago, USA, (1976-b).

Cooley, W. C., Computer Aided Engineering and Design of Cumulation Nozzles for Pulsed Liquid Jets. Proceedings of the Third U.S. Water Jet Conference, Pittsburgh, Pennsylvania, (1985).

Cooley, W. C., Fabrication and Testing of a Water Cannon for Rock Tunneling Experiments. Department of Transportation, Report No. FRAORD&D 7438, (1974).

Edney, B.E., Experimental Studies of Pulsed Water Jets. Proceedings of 3rd International Symposium on Jet Cutting Technology, BHRA Fluid Engineering (pp. B2-11-B2-26). Chicago, USA, (1976).

Kluz K., Geskin E., Petrenko O., Numerical Approximation of Propellant Driven Water Projectile Launchers, 2007 American WJPA Conference and Expo, Paper 1B, Conference of the Waterjet Technology Association, Houston, Texas, (Aug. 2007).

Glenn, L.A., On the dynamics of hypervelocity liquid jet impact on a flat rigid surface. Journal of Applied Mathematics and Physics, 25, 383-398 (1974).

Pater, L.L., Borst P.H., An Extrusion-Type Pulsed Jet Device. Proceedings of the Second U.S. Water Jet Conference, Rolla, Missouri, (1983).

Kollé J.J., Compressed Water Pulse Generators and Applications [Paper posted on Tempress Technologies, Inc. Website]. Retrieved Jun. 15, 2007 from the World Wide Web: http://www.tempresstech.com/papers/water%20cannon.pdf, (2005).

Samardzic V., Geskin E.S, Atanov G., Semko A., Kovaliov A., Investigation of Metal Processing Using High Speed Liquid Impact, paper 2-D, 2007 American WJTA Conference and Expo Proceedings of Waterjet Technology Association Conference, Houston, Texas, August (2007-a).

Samardzic V., Geskin E.S., Atanov G.A., Semko A.N., Kovaliov A.V., Liquid Impact Based Material Micro Forming Technology; Journal of Materials Engineering and Performance, vol. 16, June, pp. 375-389, (2007-c).

Samardzic V., Geskin E.S., Atanov G.A., Semko A.N., Kovaliov A.V., Investigation of Material Welding Using High Speed Liquid Impact, Journal of Materials Engineering and Performance, V. 17, (3), pp. 369-375, Jun. 2008.

Samardzic V., Kluz K., Petrenko O., Geskin E.S., Mazurkiewicz M., Berger A., Investigation of Granite Boring Using High Speed Liquid Impact, paper 4-C, 2007 American WJTA Conference and Expo, Proceedings of Waterjet Technology Association Conference, Houston, Texas, August (2007-d).

Chermensky, G.P., Breaking Coal and Rocks with Pulsed Water Jets. Proceedings of 3rd International Symposium on Jet Cutting Technology, Paper D4, BHRA Fluid Engineering (pp. D4-33-D4-50), Chicago, USA., (1976).

Geskin E.S., High-Speed Liquid Projectiles: Efficient Energy Converging Tool, Meeting the Entropy Challenge, American Institute of Physics, Conference Proceedings 1033, pp. 322-329, (2008).

Geskin E.S., Samardzic V., Petrenko O., Bitadze T., Atanov G., Semko A., Kovaliov A., Rusanova O., Feasibility Study of the Solid Freeform Fabrication of Heterogeneous Parts Using the Liquid Impact, Proc. NSF DMII Grantees Conference, Scottsdale, Arizona, Grant 990247 (2005).

Geskin E.S., Petrenko O., Potential Applications of Supersonic Liquid Streams, Proceedings of Sohn International Symposium, Advanced Processing of Metals and Materials, TMS, San Diego, V5, 275-282, Aug. 2006.

Geskin E., Petrenko O., Rusanova O., Semko A., Strength Analysis and Optimization of the Barrel Nozzle of a Powder Water Cannon, Strength of Materials, vol. 38, No. 2. p. 206-213, (2006).

DeGarmo P.E., Black T.J., Kohser R.A., Materials and Processes in Manufacturing, Macmillan Publishing Company 6th Edition, New York, 412-415, (1984).

Harjinder, S. Fundamentals of Hydroforming, Society of Manufacturing Engineers, 219 (2003).

Morphy G. Tube Hydroforming: Efficiency and Effectiveness of Pressure Sequence Hydroforming, Proceedings of the IBEC '98, vol. 5, Body Manufacturing, Assembly, and Advanced Manufacturing, Conference and Exposition, Detroit, Michigan, (1998).

Morphy G. Design Flexibility for Hydroformed Automotive Structural Parts, Technology for Product and Process Integration, International Congress and Exposition, Detroit, Michigan, (1999).

Tamhane A.A., Padmanabhan M., Fenton G., Altynova M., Daehn G.S., Vohnout V.J., Opportunities in High-Velocity Forming of Sheet Metal, Metal Forming Magazine, Jan. 1997. http://archive.•metalformingmaga•zine.•com/•1997/•01/•7mfjan5.•htm.

Benedict G.F., Nontraditional Manufacturing Processes, Published by CRC Press, 103-112, (1987).

Daehn G., High Velocity Metal Forming, ASM Handbook, vol. 14B, Metalworking: Sheet Forming,pp. 405-418, (2006).

G. A. Atanov, A. N. Semko, Propagation of a Shock Wave Through a Water Jet, Izvestiya RAN. Mekhanika Zhidkosti i Gaza. vol. 12, No. 1, pp. 165-167, Actual publication 1977 No. 1 pp. 190-192, (1977).

G. A. Atanov, A. N. Semko, Yu. D. Ukrainskii, Investigation of Internal Ballistics of a Hydromonitor, Fluid Dynamics, vol. 18, No. 4, pp. 637-640, (1983).

D.V. Shishkin, E.S. Geskin, B. Goldenberg, Development of a Technology for Fabrication of Ice Abrasives, Paper 27, WJTA American Waterjet Conference, Minneapolis, Minnesota, Aug. 18-21, 2001.

\* cited by examiner

SYSTEM AND METHOD FOR FORMING OF TUBULAR PARTS

CROSS-REFERENCE TO RELATED APPLICATIONS

This application is a continuation of U.S. patent application Ser. No. 12/905,556 filed Oct. 15, 2010 which claims the benefit of U.S. Provisional Patent Application No. 61/251,997 filed Oct. 15, 2009 and U.S. Provisional Patent Application No. 61/298,662 filed Jan. 27, 2010, the entireties of which are incorporated herein by reference.

FIELD OF THE INVENTION

The present invention relates to the use of a liquid, such as water, as a medium for conversion of available chemical, mechanical or electrical energy into kinetic energy. In particular the present invention relates to apparatus for, and methods of, forming materials of high tensile strength such as alloys using propellant driven water streams.

BACKGROUND OF THE INVENTION

Almost any mechanical device contains hollow shapes, such as tubes, shafts, shells, housings and the like. Such features as the ability to contain and guide liquid streams, minimal weight-to-strength ratio, etc. make these parts indispensable in the design of practically any mechanical device or system. It has long been a goal of manufacturers to improve geometry, precision, and mechanical properties of hollow parts since to do so would enhance energy efficiency and reliability of a number of devices. Such improvements would be especially valuable and important for the aerospace industry where weight minimization is one of the key objectives of aircraft design. However, in many cases the geometry and material choice of hollow parts are determined by the cost of fabrication rather than design optimization. Currently, deformation of hollow objects is commonly carried out by the use of hydroforming and explosive forming. Despite several obvious advantages, these processes have their shortcomings.

Hydroforming is a quasi-static process that changes the shape of a hollow part without significant expansion of the part. The drawbacks of the hydroforming process include unpredictable wall thinning in die corners, insufficient dimensional repeatability, lack of concentricity, and work hardening. These features impede process applications for forming repeatable, precise, and structurally sound expanded components. Moreover, to obtain expansions in the range of 20%, an axial tube feed is required. Another significant obstacle preventing wide adoption of a hydrostatic expansion technique is the high capital cost of forming equipment (pumps, presses, etc.).

Explosive forming is a high energy rate process that became established in the metal forming industry in the 1960s and 1970s. The method has been especially useful in the aerospace, gas turbine, and nuclear industries. The need for large components, produced in small runs and within short lead times, has been the driving force behind the development of this method. The main disadvantage of explosive forming is the lack of ability to produce small, precise, or large manufacturing volume parts. Moreover, the technology must be handled by well trained personnel and in remote facilities.

Thus there is a need in the art for systems and processes which overcome the deficiencies of traditional hydroforming and explosive forming techniques.

SUMMARY OF THE INVENTION

One aspect of the present invention relates generally to apparatus and processes whereby a propellant driven water stream is used in the formation of materials made from high tensile strength alloys. In accordance with the present disclosures high pressure developed in liquid flowing through a tubular work piece is employed to achieve desired forms. This high pressure results from superposition of compression waves generated in the course of the impact of the liquid by products of propellant combustion.

In one embodiment, a system for forming a tubular component into a desired shape is provided, which system includes a die assembly and a combustion chamber for generating gas, whereby water is driven through a workpiece located in the die assembly to mold the tubular workpiece in the form provided by the die. The combustion chamber may include a propellant charge, such as a cartridge containing propellant. An ignition mechanism may be included to initate combustion.

In another embodiment, a method of forming a tubular component into a desired shape is provided which includes using a die assembly to receive a tubular component, using a combustion chamber to generate a gas, supplying a flow of liquid through the workpiece and driving water through a tubular workpiece using the gas generated by the combustion chamber, whereby the water impacts the tubular workpiece with force sufficient to mold the tubular workpiece in the form provided by the die.

In one embodiment an apparatus is provided for forming a workpiece into a desired shape comprising a die having an interior cavity configured to receive a workpiece, the die interior cavity having a dimension and shape corresponding to a desired shape of a finished workpiece, a combustion chamber adjacent one end of the die and a tapered nozzle adjacent an opposite end of the die, the nozzle having a relief opening at an end thereof, the combustion chamber, die and nozzle being axially aligned. The die is configured to receive a workpiece having two open ends, the open ends being receiveable so that they are aligned axially with the combustion chamber and the nozzle, such that the first open end of the workpiece is adjacent the combustion chamber and the second open end is adjacent the nozzle.

The apparatus may include an ignition mechanism positioned adjacent to the combustion chamber and operable to initiate a combustion event in the combustion chamber. The combustion chamber is configured to receive a propellant charge oriented so that upon an initiating event, the propellant material is expelled along the axial direction of the workpiece.

In another embodiment the die is a split die.

In one embodiment the apparatus includes an inlet to feed liquid to an interior space of a tubular workpiece. A fluid supply may be included to provide fluid flow continuously through a tubular workpiece.

In accordance with another embodiment a method of forming a workpiece into a desired shape is provided which includes providing a die having an interior cavity configured to receive a workpiece, providing the die with an interior cavity having a dimension and shape corresponding to a desired shape of a finished workpiece, providing a combustion chamber adjacent one end of the die and a tapered nozzle adjacent an opposite end of the die, providing the nozzle with a relief opening at an end thereof, positioning the combustion chamber, die and nozzle in axially alignment, inserting a workpiece having two opposing open ends in the die cavity in axial alignment with the combustion chamber, die and nozzle, loading a propellant charge in the combustion chamber, filling the workpiece with a liquid, and activating the propellant charge. The method may include positioning an ignition mechanism adjacent to the combustion chamber and using the ignition mechanism to initiate a combustion event. The method may include providing a continuous fluid supply to flow through the tubular workpiece. In another embodiment the foregoing processes may include generating forming pressure reaching and/or exceeding 1 GPa.

In another embodiment, a method of forming a tubular workpiece into a desired shape is provided which includes providing a combustion chamber adjacent a first open end of a workpiece to be shaped, positioning a nozzle adjacent a second, opposite open end of the tubular workpiece, filling the workpiece with a liquid, positioning a die around the workpiece, activating a propellant charge in the combustion chamber and using resulting combustion and the water to transfer accumulated energy to the workpiece through compression waves.

In another embodiment a tubular device is provided made by a process comprising providing a die having an interior cavity configured to receive a tubular workpiece, providing the die with an interior cavity having a dimension and shape corresponding to a desired shape of a the tubular device to be formed from the workpiece, providing a combustion chamber adjacent one end of the die and a tapered nozzle adjacent an opposite end of the die, providing the nozzle with a relief opening at an end thereof, positioning the combustion chamber, die and nozzle in axially alignment, inserting the workpiece having two opposing open ends in the die cavity in axial alignment with the combustion chamber, die and nozzle, loading a propellant charge in the combustion chamber, filling the workpiece with a liquid, and activating the propellant charge.

In another embodiment the device made according to the foregoing process includes generating forming pressure reaching and/or exceeding 1 GPa. In yet a further embodiment the device made according to the foregoing process is a bleed tube for the axial compressor high pressure stage.

Exemplary embodiments in accordance with the present disclosure show that the forming of hollow parts can be achieved effectively if high energy rate deformation is carried on in an open system rather than in a sealed container. Using certain exemplary applications of the disclosures herein it has been shown that despite large strains, exceeding in some cases the static test elongation limit, samples generated in accordance with the present disclosures were characterized by a uniform wall thinning and structural integrity. For example, a 55% expansion of Ti-3Al-2.5V tube was attained using a simple setup employing an embodiment disclosed herein. Acquired experimental data show that the presently disclosed apparatus and methods can be applied to form alloys characterized by high tensile strength, low static elongation limits, and low modulus of elasticity. The dimensional stability, feasibility of large deformations, safety of use, ability to form small precise parts in large quantities, and compact and inexpensive facilities are some of the advantages of the present disclosures in comparison to conventional quasi-static hydro expansion, hot forming, and high energy rate explosive forming techniques.

Given above is a simplified summary of the disclosure in order to provide a basic understanding of some aspects described herein. The advantages described herein and others will be apparent to those having skill in the art.

BRIEF DESCRIPTION OF THE DRAWINGS

To assist those of ordinary skill in the relevant art in making and using the subject matter hereof, reference is made to the appended drawings, wherein.

Figure 1:
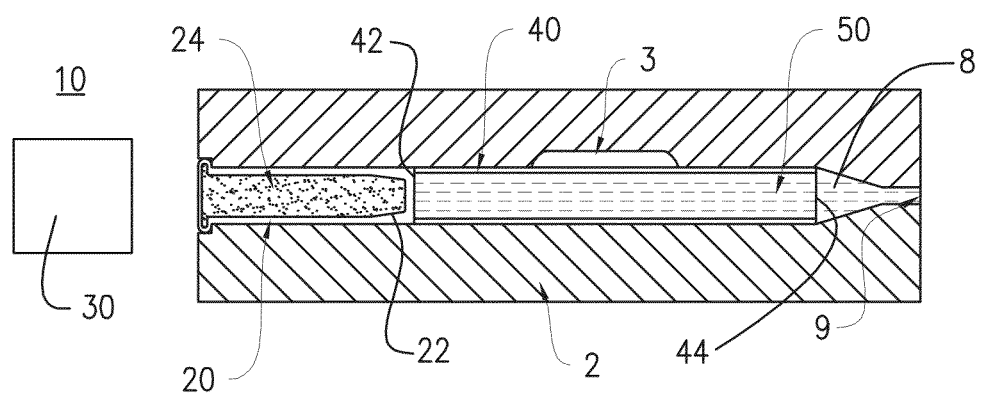
FIG. 1 depicts an apparatus for forming a workpiece in accordance with an aspect of the present disclosure.

It should be noted that the appended drawings illustrate only typical embodiments of this invention and are therefore not to be construed as limiting of its scope, for the invention may admit to other equally effective embodiments.

DETAILED DESCRIPTION OF THE INVENTION

The following is a detailed description of the invention provided to aid those skilled in the art in practicing the present invention. Those of ordinary skill in the art may make modifications and variations in the embodiments described herein without departing from the spirit or scope of the present invention. Unless otherwise defined, all technical and scientific terms used herein have the same meaning as commonly understood by one of ordinary skill in the art to which this invention belongs. The terminology used in the description of the invention herein is for describing particular embodiments only and is not intended to be limiting of the invention. All publications, patent applications, patents, figures and other references mentioned herein are expressly incorporated by reference in their entirety.

In the following description, for purposes of explanation, specific numbers, materials and configurations are set forth in order to provide a thorough understanding of the invention. It will be apparent, however, to one having ordinary skill in the art that the invention may be practiced without these specific details. In some instances, well-known features may be omitted or simplified so as not to obscure the present invention. Furthermore, reference in the specification to phrases such as "one embodiment" or "an embodiment" means that a particular feature, structure or characteristic described in connection with the embodiment is included in at least one embodiment of the invention. The appearances of phrases such as "in one embodiment" in various places in the specification are not necessarily all referring to the same embodiment.

In general, the presently disclosed apparatus and methods employ a deformation force developed by superposition of compression waves generated in an impact accelerated stream flowing through a tubular work piece confined by a die. Superposition of compression waves, developing in a moving fluid, brings about formation of pressure pulses, which by far exceed the impact pressure at the free surface boundary of the liquid. The result is a tubular workpiece conformed to the shape and dimension of the interior cavity of the die.

In one aspect of the present invention, the products of propellant combustion are used to impact a liquid filling a tubular work piece and expel the liquid via a nozzle. Now referring to FIG. 1, an apparatus 10 for forming a workpiece in accordance with the present disclosures includes a die assembly 2, a combustion chamber 20, and an ignition mechanism 30. The die assembly 2 has an interior cavity 3 having a dimension and shape corresponding to the desired final form of a workpiece 40. The apparatus 10 includes a combustion chamber 20 adjacent one end of the die and a nozzle 8 adjacent the opposite end of the die 2, the nozzle having a relief opening 9 at the nozzle tip. The die 2 is configured to receive the workpiece 40 such that one end 42 of the workpiece 40 is adjacent the combustion chamber 20 and the other end 44 is adjacent the nozzle 8.

The ignition mechanism 30 is positioned adjacent the die 2 and combustion chamber 20 for initiation of combustion.

The combustion chamber 20 may in one embodiment be operable to receive a propellant charge 22 such as a propellant cartridge containing propellant material 24. Propellant charge 22 may be a commercially available cartridge such as, Remington 38 Special Blank 38BLNK, Winchester 38SBLP, 38 Special Blank, and CCI .22 Smokeless Short Noise Blank, .22 Caliber. It will be apparent to those skilled in the art any suitable cartridge may be used, such that a desired propellant type and amounts may be used for a particular application. Propellant material 24 may be a nitrocellulose-based fast burning propellant material such as Winchester® WC760 smokeless powder, Winchester® 231, IMR® 3031, and IMR® 7828. The propellant to water weight ratio depends on the extent of deformation to be performed, tube size, and mechanical properties of tube material. In experiments performed the effective weight ratio ranged between 1/10 and 1/20. The propellant charge 22 is fitted in the combustion chamber 20 so that the workpiece end 42 adjacent to the ignition mechanism 30 is in tight connection therewith so that the propellant material 24 is expelled along the axial direction of the workpiece 40.

Figure 1A:
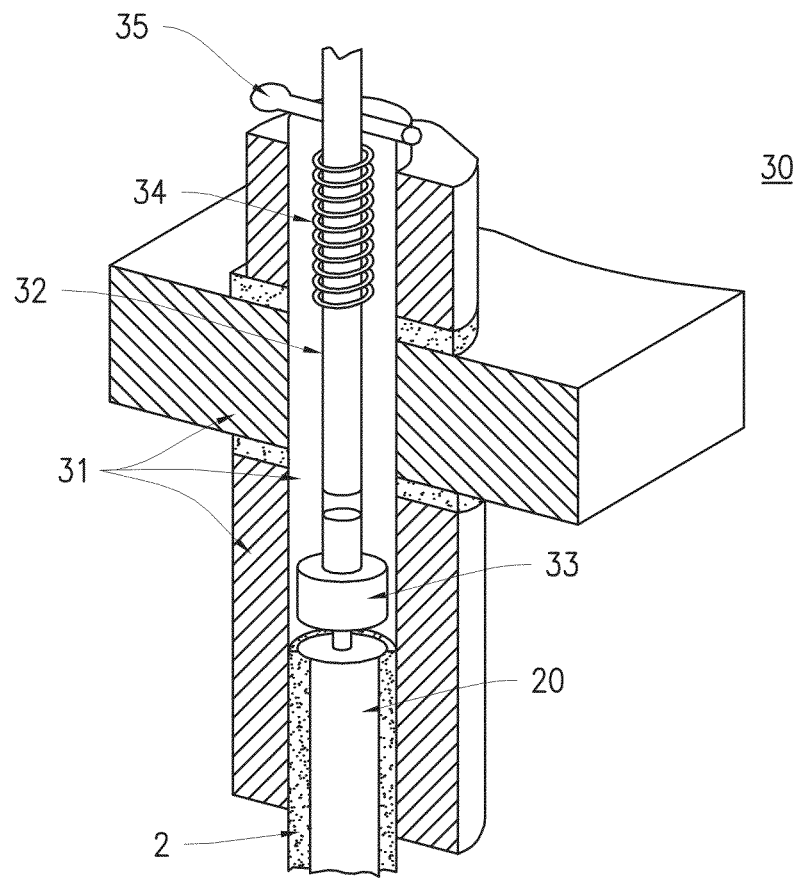
FIG. 1A depicts an ignition apparatus in accordance with an aspect of the present disclosure.

Now referring to FIG. 1A, an embodiment of an ignition mechanism 30 is disclosed which may be used to initiate the process of propellant combustion. Ignition mechanism 30 may include a support 31, impact pin 32, primer pin 33, initiation spring 34 and safety pin 35. Support 31 may engage die 2 using any suitable securing means including but not limited to a threaded engagement as shown, bolting, clamping, latching, or the like. In the depicted embodiment the support 31 maintains the position of the impact and primer pins 32 and 33, respectively, and prevents recoil. The support 31 also prevents the escape of combustion products. The safety pin 35 may be removed to actuate the ignition mechanism.

In one embodiment the die 2 is made of two halves, which when fitted together provide a desired interior cavity dimension and shape to which the finished workpiece 40 conforms. Such a split die permits simple disassembly and work piece removal. The dies may be made of any suitable material, such as general purpose low carbon steel, such as low carbon steel 1018. In certain exemplary embodiments, the cavities are cast with CerroBend 158, a low temperature melting alloy with tensile strength of 41 MPa, 9.2 Brinell hardness, and melting temperature of 70° C.

Figure 1B:
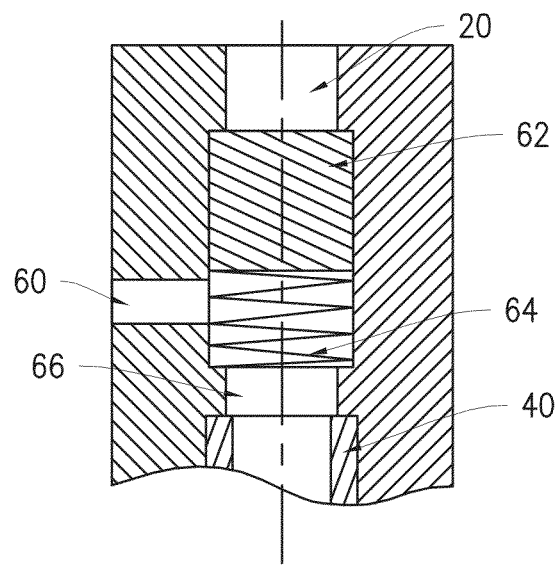
FIGS. 1B and 1C depict an embodiment for continuous water delivery to an apparatus subject to interruption by a check valve in accordance with an aspect of the present disclosure.
Figure 1C:
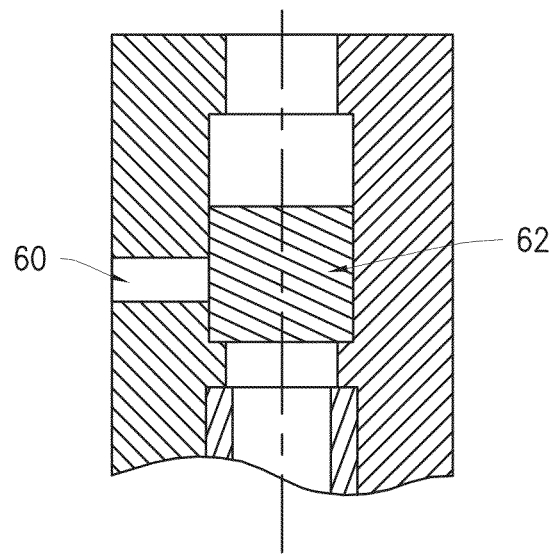

In preparation for use of the apparatus 10, a fluid 50 is introduced into the workpiece 40. Fluid 50 may be any suitable liquid such as water. Liquid 50 may be introduced for example through the combustion chamber 20 prior to insertion of the propellant charge 22. The nozzle 9 may be plugged by any suitable means, such as but not limited to paraffin, to prevent escapement of liquid 50. Now referring to FIGS. 1B and 1C, in one embodiment an inlet 60 is provided in the apparatus 10 to feed liquid 50 to an interior space of a workpiece 40. For commercial high volume applications, the apparatus 10 may include an inlet 60 to supply fluid 50 continuously to the apparatus 10 for introduction to the workpiece 40. In one embodiment, a check valve 62 and spring are positioned between the combustion chamber 20 and the workpiece 40 in proximity to the inlet 60. A water compression chamber 66 may be provided between check valve 62 and workpiece 40. The check valve 62 is shown in FIG. 1B in an upper position, before ignition, such that the inlet 60 is open. In FIG. 1C the check valve 62 is shown in the closed position, upon combustion, which stops the flow of liquid 50 to the interior space of the workpiece 40. The check valve 62 acts as a piston to transfer impact energy into the liquid 50 and generate pressure waves. Upon completion of the combustion event, the spring 64 restores the check valve 62 to the open position, permitting water to enter the workpiece 40.

In a method in accordance with one embodiment, a workpiece 40 is inserted in die 2. Prior to the activation of the ignition mechanism 30, the workpiece 40 is filled with a liquid 50 such as water. A propellant charge is loaded into apparatus 10. The propellant charge is activated. The water 50 works as a powerful forming medium. It accumulates energy generated in the course of propellant combustion and subsequently transfers it to the work piece 40 through propagated, refracted, and reflected compression waves. Pressure amplification results from the superposition of compression waves. Consequently, the workpiece 40 absorbs the energy of the compression wave and deforms adopting the shape of the die cavity 3. Due to the high rate of the energy release (the duration of combustion is typically less than 0.5 ms), embodiments of the present disclosures can be classified as high-energy rate forming processes wherein a tubular object, confined by a die, can be successfully processed to form a desired shape.

Figure 2:
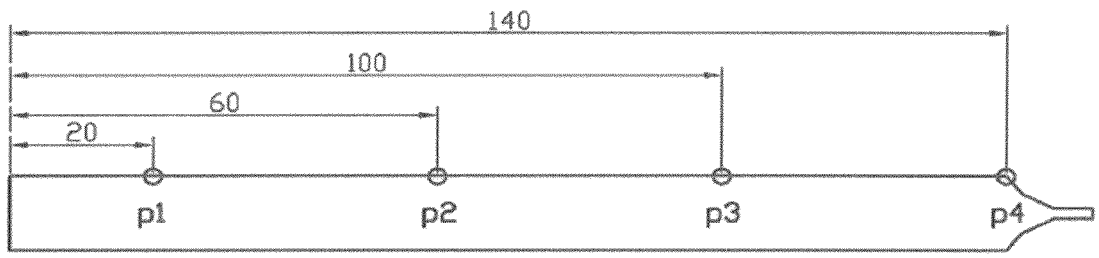
FIGS. 2 and 2A are pictorial (FIG. 2) and graphical (FIG. 2A) depictions numerically obtained, time dependent pressure at different points of a rigid tube (barrel) in accordance with an aspect of the present disclosure.
Figure 2A:
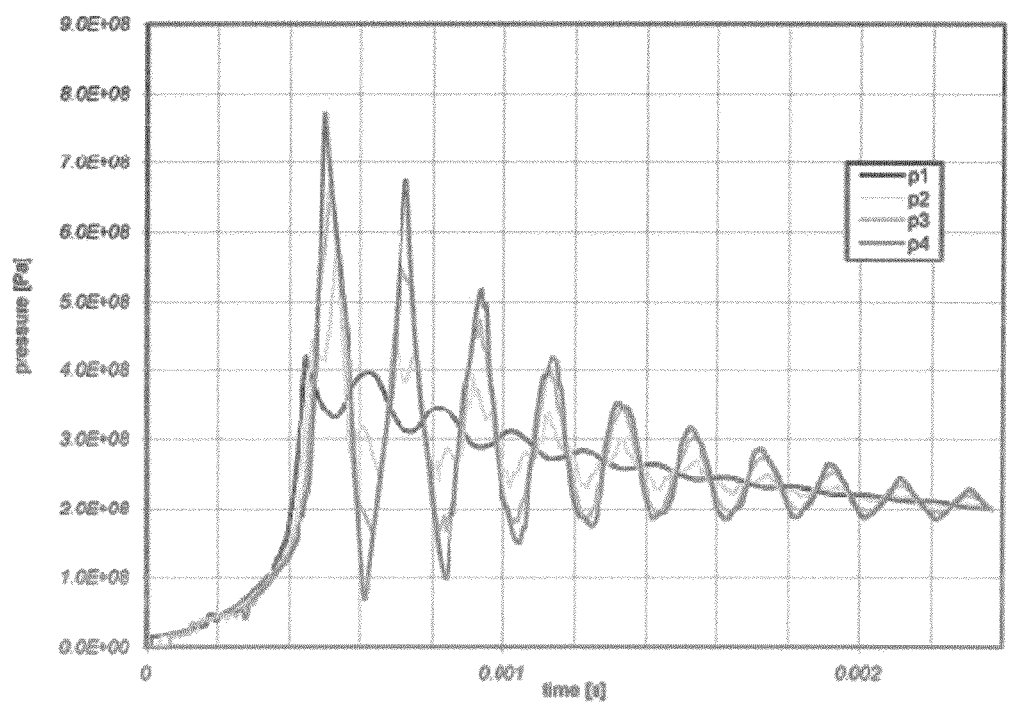

Now referring to FIGS. 2 and 2A, the calculated values represent the numerically obtained, time dependent pressure at different points of a rigid tube (barrel) in experimentation on one particular exemplary embodiment. The geometry of said embodiment corresponds to the dimensions of tubular components tested. For this exemplary embodiment, the graph shows clearly that the incited compression wave is most intense near the nozzle entrance. Other points, closer to the combustion chamber of said exemplary embodiment, are characterized by lower amplitudes, the values of which decrease in the course of time and with increasing distance from the nozzle. The pressure functions at points p2, p3, p4 for said embodiment have the same phase, which is opposite to the pressure function at point p1. The pressure at point p1 relates to the impact pressure created by rapid combustion of the cartridge propellant, while the pressures at points p2, p3, p4 are the responses to the applied impact for said embodiment. Due to the oscillatory mode of the pressure variation, caused by traveling waves, the process in question has been defined as a compression pulse forming. The presently disclosed forming technique, utilizing induced compression pulses, differs from explosive forming and hydro expansion processes in that the apparatus employed uses non-constrained component ends, employs low explosive with incompressible fluid, eliminates axial feed, requires no sealing, and uses a converging nozzle as a flow control.

Depending on the internal work piece geometry, the pressure at the nozzle entrance can exceed the pressure of combustion products by a factor of two for certain exemplary embodiments. Thus, the impact pressure generated in the combustion chamber can be significantly lower than the forming pressure for these exemplary embodiments. Hoop stresses, resulting from high pressure exerted on a workpiece, cause its plastic deformation. A tube or another work piece absorbs these stresses and protects the die assembly. Therefore, it is possible to generate pressure in the order of several GPa needed for processing of thick walled components in accordance with the present disclosures.

The magnitude of pressure exerted on a work piece can be precisely controlled by component geometry, propellant mass, and its properties. Existing pumps cannot generate comparable pressure nor maintain its oscillatory mode, which contributes toward axial material flow.

The compression pulse methods described herein and utilized in the experiments and examples herein are effective in forming of high tensile strength tubing. The simplicity of design and operation and low capital cost make this method suitable for both rapid prototyping and high volume manufacturing. The technology enables generation of metal components, which could either not be made at all or could only be made at very high cost using existing technologies. The disclosed processes can eliminate the need for welded joints, which otherwise would be required to assemble a desired shape in the middle of the tube section. Further, formed shapes can replace certain machined components and reduce the weight of an assembly.

Water pressure generated in accordance with the present disclosures exceed the ultimate yield stress of materials such as metals and high strength alloys, such as, for example, those currently used in the aerospace industry. Alloys such as stainless steel 321, Inconel 625, and Ti-3Al-2.5V are of particular interest since they represent the main tube materials used in aerospace engines. These alloys are used only to illustrate potential commercial applications in the aerospace industry. The skilled artisan will recognize the present disclosures contemplate wider application to many industries using a wide range of metals and/or alloys. Because of the extremely short duration of forming in accordance with the present disclosures, there is no need for special provisions to seal a die assembly or work piece. The duration of the forming process is less than the time needed for draining the internal space of a work piece and die assembly.

Experiments

Testing of three alloys extensively used in aerospace and gas turbine industries provided experimental data about embodiments of this novel forming technology. The alloys, assigned with aerospace specifications, were AMS 5557, AMS 5581, and AMS 4943. Common commercial names for them are stainless steel 321, Inconel 625, and Ti-3Al-2.5V (ASTM Grade 9), respectively. The AMS (Aerospace Material Specification) designation is not only pertinent to chemical and mechanical properties, but also specifies the form of the material used. The materials were provided in the form of seamless tubing. They were annealed, stress relieved, and hydrostatically tested. Table 1 provides chemical composition of the tested alloys while Table 2 presents the mechanical properties thereof

TABLE 1

| Alloy Type | Chemical Composition in % | | | | |
|---|---|---|---|---|---|
| AMS 5557 | C = 0.046 | Mn = 1.64 | P = 0.025 | S = 0.001 | |
| | Cr = 17.5 | Ni = 10.65 | Mo = 0.38 | Cu = 0.24 | |
| | Si = 0.44 | Ti = 0.32 | N = 0.014 | Fe = Bal | |
| AMS 5581 | C = 0.02 | Mn = 0.29 | P = 0.008 | S < 0.002 | Si = 0.16 |
| | Cbta = 3.44 | Co = 0.29 | Ti = 0.26 | Al = 0.25 | Fe = 4.14 |
| | Cr = 21.69 | Ni = 60.0 | Mo = 8.71 | Cb = 3.39 | Ta < 0.05 |
| AMS 4943 | AL = 3.06 | B < 0.0005 | C = 0.005 | Cu < 0.0025 | |
| | O = 0.0940 | Si = 0.012 | Ti = Bal | V = 2.47 | |
| | Fe = 0.128 | W < 0.003 | Y < 0.0005 | | |

TABLE 2

| Alloy Type | Tensile Strength | Yield Strength | 0.2% Offset Yield Strength | Elongation |
|---|---|---|---|---|
| AMS 5557 | 638 MPa | 286 MPa | — | 42% |
| AMS 5581 | 958 MPa | — | 541 MPa | 47% |
| AMS 4943 | 636 MPa | — | 560 MPa | 26% |

The forming system of one particular embodiment of the present invention, illustrated in FIG. 1, is one of the simplest systems for practical application of the disclosed methods. A forming tool in accordance with FIG. 1 was designed, engineered, and manufactured in the Water Jet Laboratory at NJIT. For purposes of the experiments, the die was made of two halves, which reproduced the final product shape. The die was designed to allow simple disassembly and work piece removal. For said embodiment, the dies were made of general purpose, low carbon steel 1018, which performed adequately. In certain experiments, the cavities were cast with CerroBend 158, low temperature melting alloy with tensile strength of 41 MPa, 9.2 Brinell hardness, and melting temperature of 70° C. No provisions for air removal from the die cavities were made in these particular exemplary embodiments.

Figure 3:
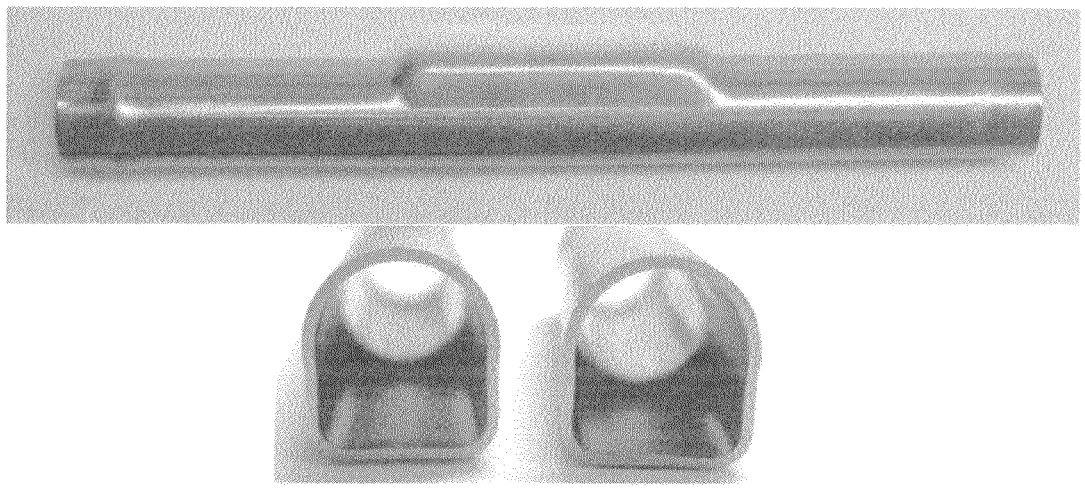
FIG. 3 presents photographs of a sample of AMS 5557 tube material having one side expanded formed in accordance with an aspect of the present disclosure.
Figure 4:
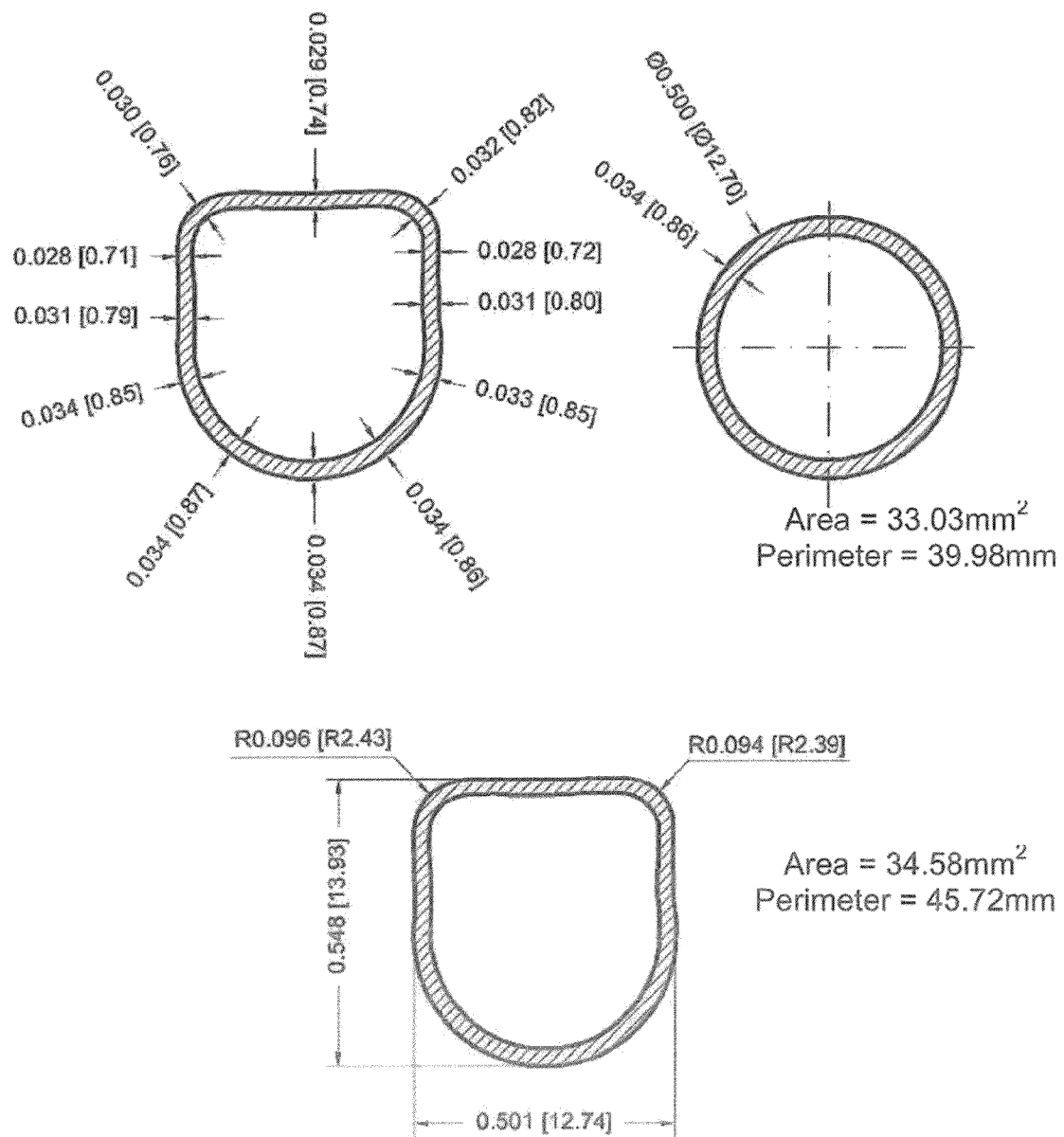
FIG. 4 presents dimensional analyses of the sample in accordance with FIG. 3.

One experiment involved expansion of the AMS 5557 alloy. The sample was represented by a standard aerospace schedule seamless tube with a diameter of 12.70 mm, wall thickness of 0.89 mm, and length of 118.62 mm. The die cavity and consequent expansion were not symmetrical in regard to the tube axis. FIG. 3 shows the formed sample created, while FIG. 4 presents the dimensional analysis of the cross sectional deformation at an arbitrary cross section in the middle of the expanded section. After the forming experiment, the length of the sample decreased to 116.59 mm. The perimeter of the cross sectional profile increased by 14.4%, whereas the minimum wall thickness decreased to 0.71 mm. This accounts for 20% of the wall thinning. The cross sectional area increased by 4.7%. Corner radii of the die cavity were machined with the 2.38 mm-radius end mill. As seen in FIG. 4, the outer radii of the expanded section were almost precisely equal to the die cavity radii.

Figure 5:
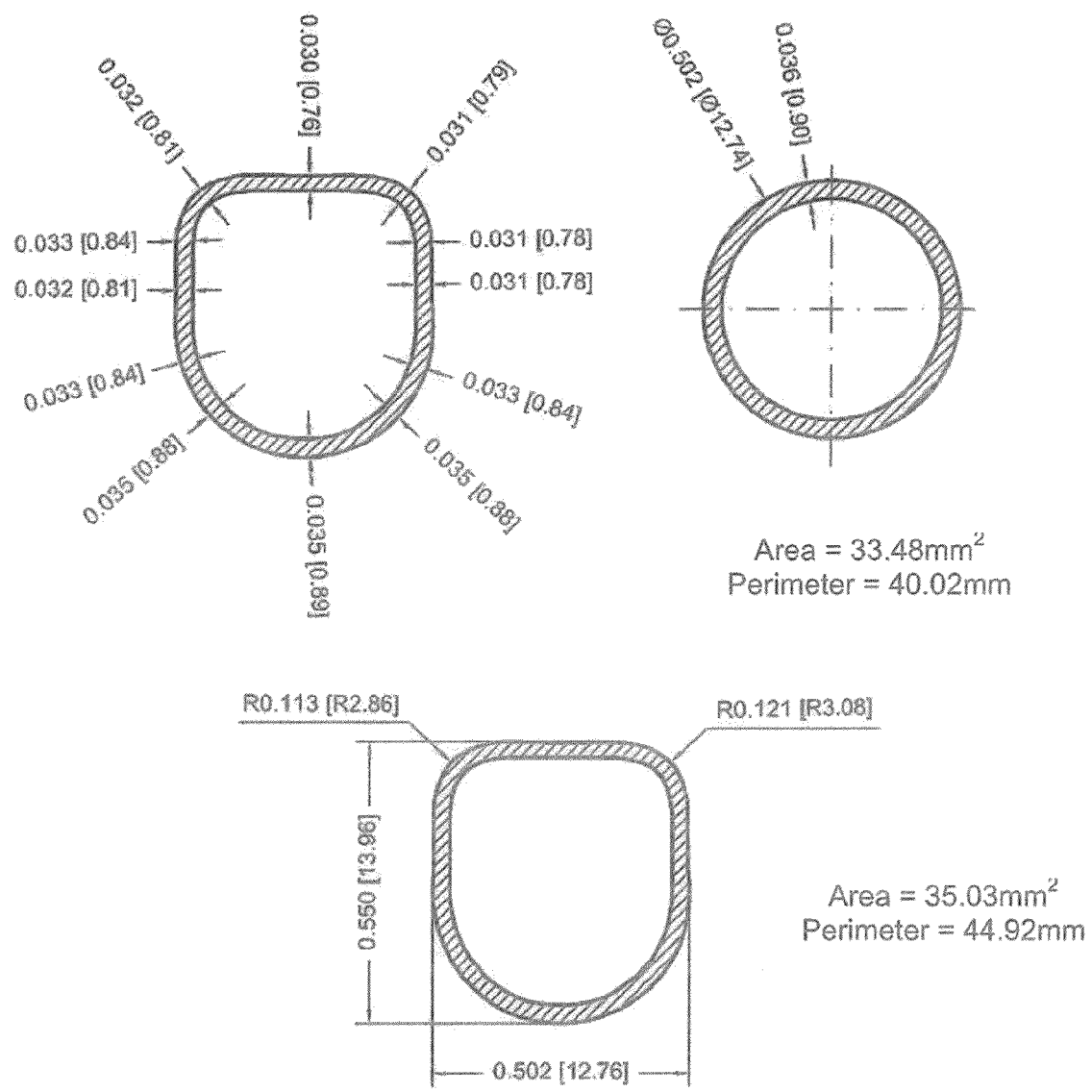
FIG. 5 presents dimensional analyses of a sample of AMS 4943 tube material formed in accordance with an aspect of the present disclosure.

Another experiment employing the systems and methods disclosed herein involved the expansion of the AMS 4943 alloy. The same die cavity used in the previous experiment was utilized in this experiment. The seamless sample dimensions were 12.74 (the outer diameter)×0.90 (the wall thickness)×118.82 (the tube length) mm. FIG. 5 depicts the cross sectional geometry of the generated shape. The length of the sample after the experiment was 115.87 mm. The perimeter increased by 12.29% and minimum wall thickness decreased to 0.76 mm (18.3% of the wall thinning). The cross sectional area increased by 4.6%. The radii of the generated shape were 2.86 and 3.06 mm.

Figure 6:
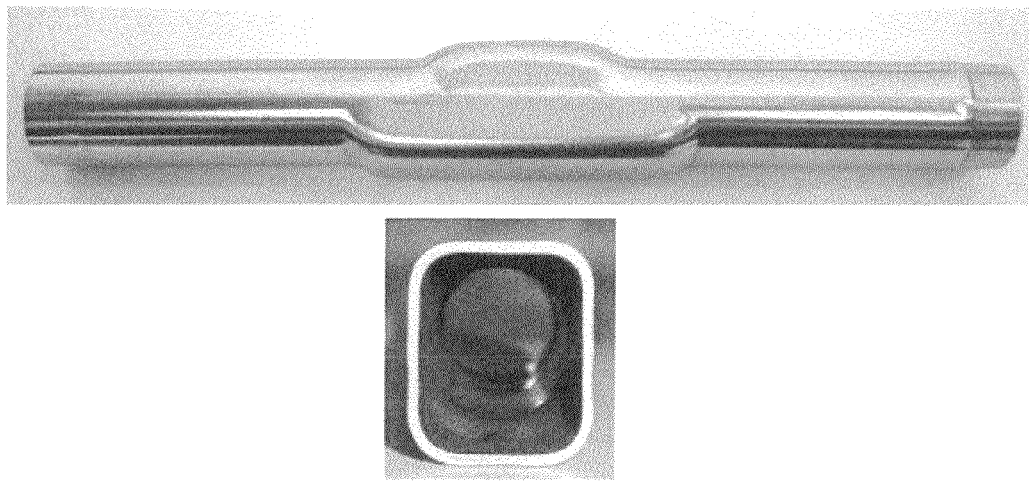
FIG. 6 presents photographs of a sample of AMS 5581 tube material having two sides expanded formed in accordance with an aspect of the present disclosure.
Figure 7:
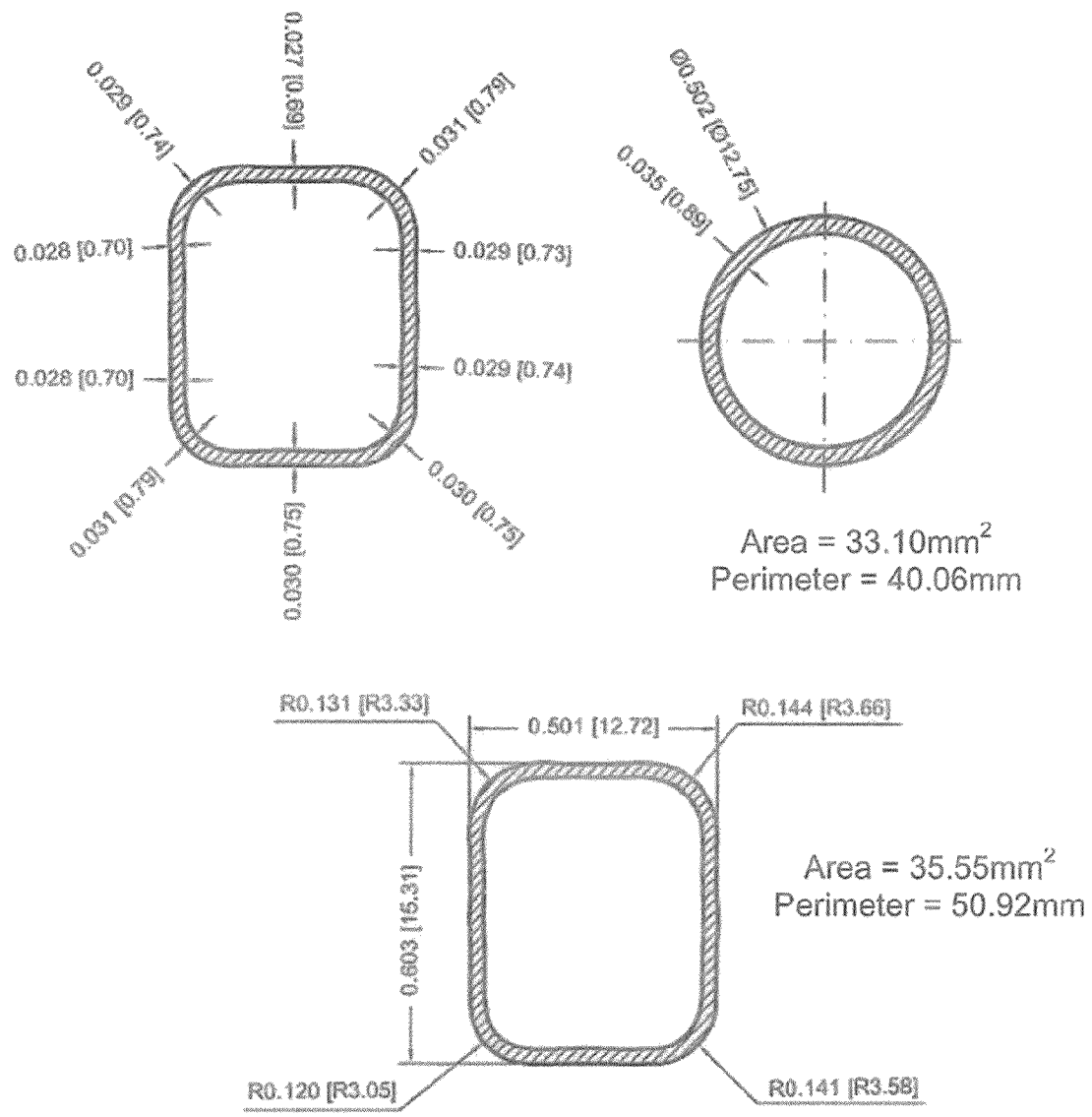
FIG. 7 dimensional analyses of the sample in accordance with FIG. 6.

The seamless tube made of the AMS 5581 alloy was the subject of another experiment. The forming process of this embodiment was dual-sided. The sample dimensions prior to forming were 12.75×0.89×117.98 mm. FIG. 6 is a photograph of the formed workpiece. FIG. 7 describes the cross sectional geometry of the formed shape. The length of the sample after the experiment was 115.57 mm. The perimeter increased by 27.1% and the minimum wall thickness decreased to 0.69 mm (29.6% of the wall thinning). The cross sectional area increased by 7.4%. The radii of the formed shape were 3.05, 3.33, 3.58, and 3.66 mm.

Figure 8:
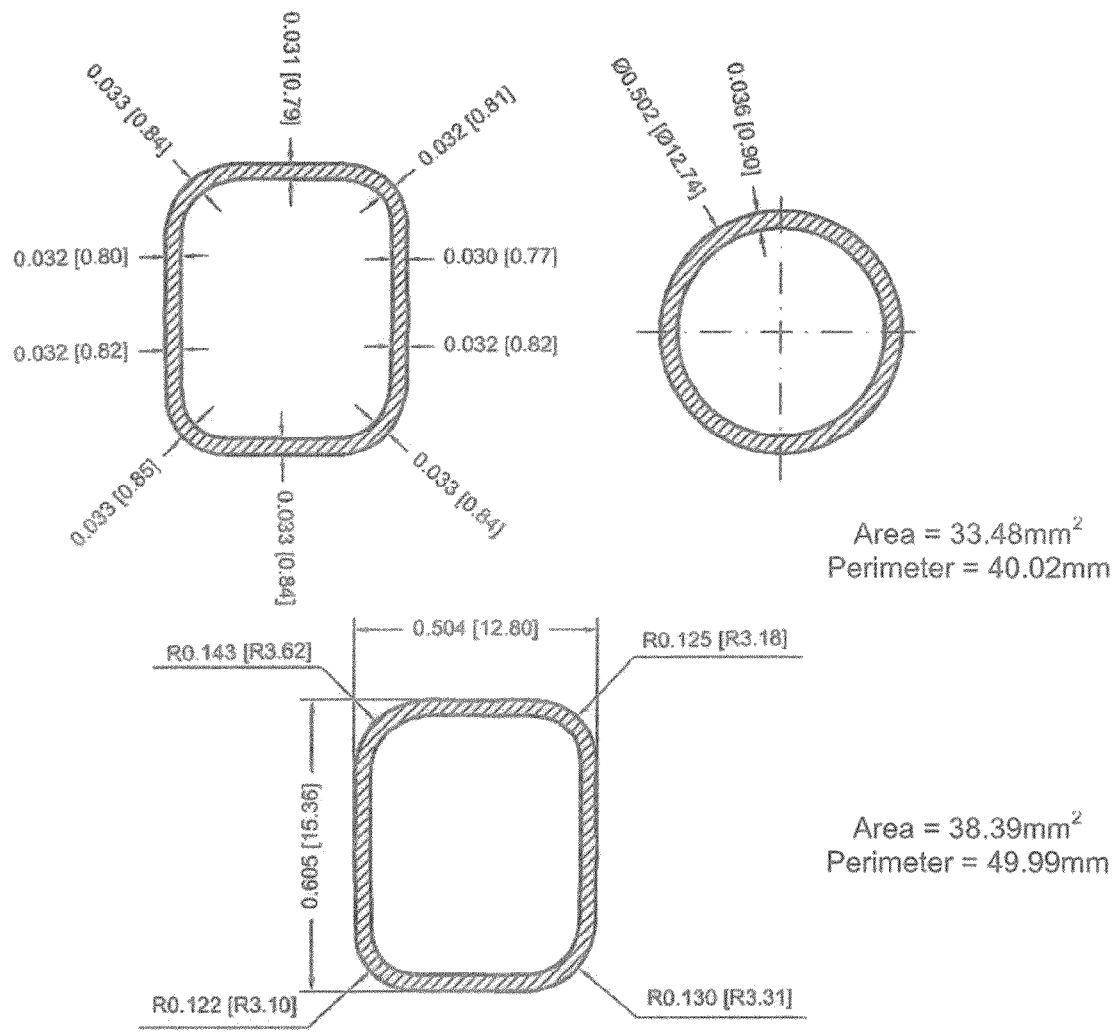
FIG. 8 presents dimensional analyses of a sample of AMS 4943 tube material formed in accordance with an aspect of the present disclosure.

Another experiment for yet another exemplary embodiment of the present invention involved the two-sided expansion of the AMS 4943 alloy. The geometry of the die cavity remained the same as in previous experimentation. The seamless sample dimensions were 12.74×0.90×117.98 mm. FIG. 8 presents the analysis of the cross sectional geometry. The total length of the sample decreased to 113.79 mm while the perimeter increased by 24.9%. The wall thickness at the investigated cross section decreased to 0.77 mm which accounts for 16.7% of the wall thinning while the cross sectional area increased by 16.2%. The radii of the generated shape were 3.10, 3.18, 3.31, and 3.62 mm.

Figure 9:
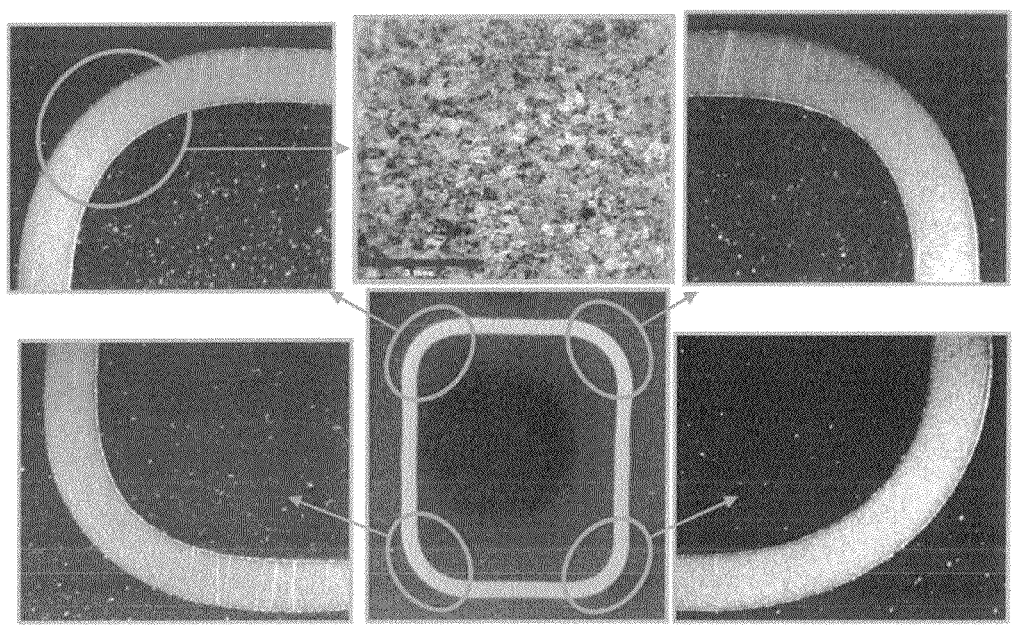
FIG. 9 presents photographs of metallographic samples of AMS 4943 tube material showing two-sided deformation in accordance with an aspect of the present disclosure.

The microstructure of the generated sample using this particular embodiment was investigated. The Ti-3Al-2.5V alloy is more brittle than chromium-nickel alloys and its tensile elongation limit is half of the elongation limit of these alloys; therefore, the tested sample inclined toward cracking when subjected to excessive deformations. FIG. 9 shows a polished and etched sample cross section of the deformed sample. No indications of crack development were observed.

Figure 10:
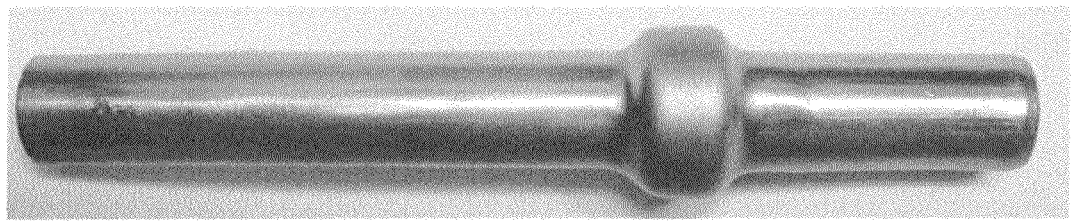
FIG. 10 presents a photographic side view of a sample of AMS 4943 tube material formed in accordance with an aspect of the present disclosure, showing 55% symmetric expansion, wherein the original tube wall thickness=0.0355 in. (0.90 mm)
Figure 10A:
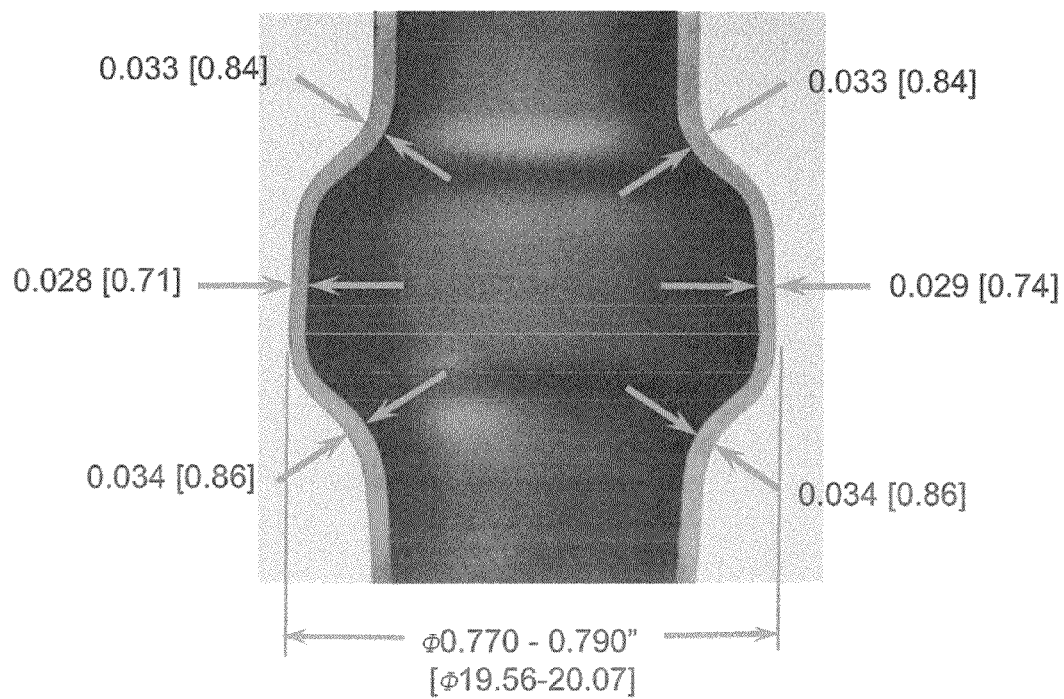
FIG. 10A is a cross-sectional view of the sample in accordance with FIG. 10 indicating symmetric expansion of a portion thereof.

The significant expansion of an AMS 4943 tube was the subject of a further experiment in accordance with the present disclosures. The seamless tube sample dimensions before expansion were 12.74×0.90×117.60 mm. A die cavity was made out of the CerroBend 158 alloy, which experienced a limited amount of deformation during forming. In this embodiment, air was not evacuated from the die cavity; nor had the cavity any air relief openings. FIG. 10 depicts a general view of the formed tube while FIG. 10A depicts the dimensions of its cross section. The total length of the sample decreased to 111.00 mm. The expansion of the outside diameter ranged between 19.50-20.00 mm, which relates to the average increase by 55% of the perimeter of the sample. The wall thickness at the investigated cross section decreased to 0.71 mm, which accounts for 20% of the wall thinning.

Figure 11:
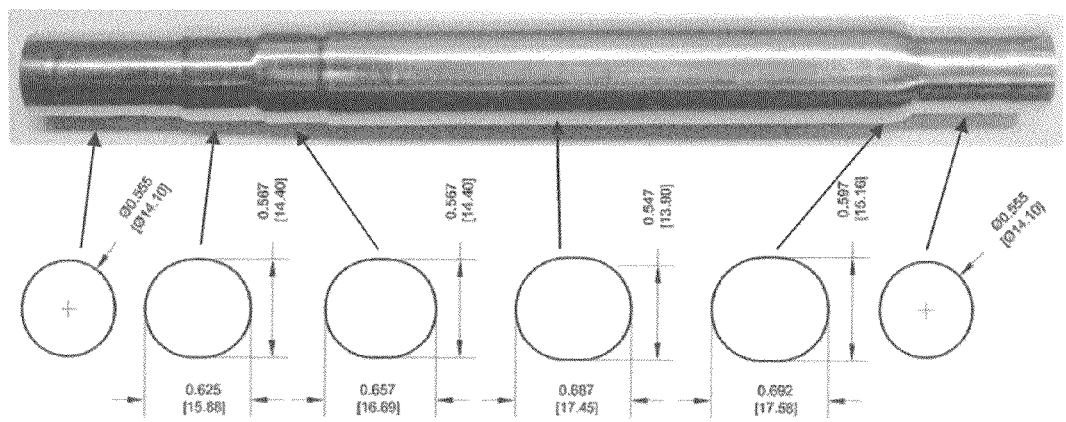
FIG. 11 presents photographs of a sample of AMS 5881 heat shield tube material with multiple elliptical cross-sections formed in accordance with an aspect of the present disclosure.

Now referring to FIG. 11, an actual aerospace part, a heat shield made of thin wall AMS 5581 and used in a tube assembly of an aerospace engine, was a subject of the next experiment. The dimensions of the tube before forming were 14.4× 0.25×170 mm. Multiple elliptical cross sections were formed from a single round tube. The maximum gain in a perimeter after expansion was 18.5%. Limited spring back was observed (within 0.003"). The partition line ridge on the formed component, 0.006" wide, was visible at the die dividing plane. In this embodiment, the division line can be eliminated by changing die design from a split die to a single piece die. For such an embodiment, this can be achieved in an electro discharge machine by employing a sinking electrode technique.

Traditional punch-and-die forming technologies cannot achieve the tube sections expanded in the course of the foregoing experiments embodiments of the present invention are inaccessible to the traditional. Contrary to hydro expansion, in the compression pulse forming utilized in the embodiments disclosed herein, the process of forming of central tube sections does not involve any obstacles. The limited presence of axial constraints of the work piece in the exemplary embodiments allow dislocation of the sample material toward an expanded section. Moreover, the compression pulse forming described herein is a dynamic process where the traveling wave acts only on a particular section of the work piece and not on a whole tube. While a specific section of the tube is subjected to the high pulse pressure, the pressures exerted on other parts of the work piece are much lower (FIG. 2A). Thus, axial friction forces between the die and the tube obstructing metal redistribution are significantly reduced.

This hypothesis is validated by the experimental results herein showing the shortening of tube length and increase of the cross sectional area of the expanded component sections. The percentage-wise decreases in the length during five forming experiments were 1.7%, 2.5%, 2.1%, 3.7%, and 5.9%, while the increase in the cross sectional areas in the first four experiments were 4.7%, 4.6%, 7.4%, and 16.2% respectively. These results clearly demonstrate the material dislocation toward the expanded sections. This is a major advantage of embodiments disclosed herein, which allow significant expansions of the middle of the work piece without the axial feeding.

Despite significantly reduced axial friction, there is a presence of circumferential friction. This is demonstrated by experiments involving one-sided expansion (FIGS. 4 and 5). The circumferential friction, between a tube and a die, acts in the plane perpendicular to the work piece axis. This contributes to formation of limited deformation zones (dead zones). During the experiments, the material did not flow uniformly along the whole work piece perimeter for certain exemplary embodiments. FIGS. 4 and 5 show no material elongation over approximately ⅓ of tube cross sections. This indicates that friction forces overcame expansion forces acting along the perimeter, which resulted directly in limited material elongation in the dead zone. However, when other embodiments utilized double sided expansion (FIGS. 7 and 8), the presence of dead zones was significantly reduced.

The feasibility to generate complex hollow shapes is demonstrated by the forming of the AMS 5581 and AMS 4943 alloys (FIGS. 7 and 8). The double-sided deformation of tubes was accomplished using dies containing cavities in both split halves. Reduced contact areas between dies and work pieces allowed uniform material thinning along the whole perimeter of expanded shapes. The comparison of experiments involving expansion of the AMS 4943 alloy shows the relation between the wall thinning and the die contact area.

The experimental results depicted in FIGS. 5 and 8 were compared. In one embodiment involving one-sided expansion of a titanium alloy, the difference between the maximum and minimum wall thicknesses was 17%, while the same ratio for an embodiment utilizing a two-sided expansion was 6%. The attained uniform wall thinning, with structurally sound corner radii, constitutes an important result not attainable in quasi-static forming processes.

The experiment to form a titanium alloy as shown in FIG. 10 demonstrates the capability of a significant expansion of hard-to-form materials characterized by high tensile strength, low modulus of elasticity, large spring back, and low static elongation limits. A local 55% increase in the AMS 4943 tube diameter was attained. The result significantly surpasses cold forming strain limits. The increase in material ductility is comparable with hot forming at approximately 600° C.-800° C. The hot forming process is a male-female die process, which has limited access to the middle sections of a tubular work piece. Moreover, due to oxygen air, hot forming produces a visible surface oxide scale and diffused-in oxygen layer (alpha case). This brittle layer requires removal by pickling in HF-HNO3 acid solutions, otherwise a formed product would be susceptible to fatigue cracking. Due to these shortcomings, the hot forming has the status of a special process, which has to be regulated by third party approvals.

Despite imperfections of manually manufactured dies resulting in visible minor deficiencies of the generated shapes, the samples created in the experiments had considerably reduced spring back. Examples involving both alloys (Inconel 625 and Ti-3Al-2.5V), characterized by a significant spring back in quasi-static forming, show a limited evidence of spring back. As demonstrated in FIGS. 7 and 8, the height and width of expanded shapes precisely reproduced (within 0.002") these dimensions of the die cavity. Moreover, a thin wall component presented in FIG. 11, in which all dimensions are in agreement within 0.003" of the die dimensions, confirms the feasibility of precision forming, a major advantage over the prior art, using the apparatus and methods disclosed herein. The compression pulse traveling at the speed of sound is sufficient to generate strain rates adequate to overcome the spring back.

Example

Figure 12:
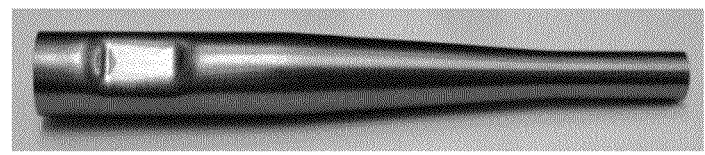
FIG. 12 is a photographic top plan view of a workpiece formed into a compressor high pressure stage bleed tube in accordance with an aspect of the present disclosures.
Figure 12A:
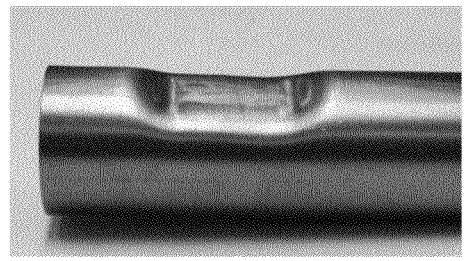
FIG. 12A is a photographic side view of a detail of the compressor high pressure stage bleed tube of FIG. 12.

Now referring to FIGS. 12 and 12A, a compressor high pressure stage bleed tube for commercial applications was formed in accordance with the present disclosures. The bleed tube was made from OD 0.500×0.028 thick AMS 4943 tube.

As was shown above, multiple exemplary embodiments of the present invention show the traveling compression waves propagate with the speed of sound through a liquid stream flowing through a work piece confined by a die. Due to the nature of the traveling waves at each instant of time, only a section of a work piece and a die are exposed to the high water pressure. Thus while super-high pressure is exerted on the die halves, the total force separating them is rather limited. This significantly simplifies, and in fact makes practical, the design of tools for the implementation of the proposed forming technology described herein.

Although the systems and methods of the present disclosure have been described with reference to exemplary embodiments thereof, the present disclosure is not limited thereby. Indeed, the exemplary embodiments are implementations of the disclosed systems and methods are provided for illustrative and non-limitative purposes. Changes, modifications, enhancements and/or refinements to the disclosed systems and methods may be made without departing from the spirit or scope of the present disclosure. Accordingly, such changes, modifications, enhancements and/or refinements are encompassed within the scope of the present invention.

All references cited are incorporated herein by reference in their entireties.

REFERENCES

1. Atanov G., Geskin E., Kovaliov A, Semko A., (2004), Powder Hydro-Cannon at Wide Range of Parameter Change, *Prikladnaya Hidromechanika*, Vol. 6 (78). No 3.-Pp. 3-9 (in Russian)
2. Atanov, G. A., Gubskiy, V. I., Semko, A. N. (1977). Internal ballistics of powder hydrocannon. Izv. RAN. *Mechanics of liquid and gas,* 6, 175-179.
3. Atanov, G. A, Gubsky, V. I., Semko, A. N. (1996). The Pressure Rise Factor For Powder Hydro-cannon. Proceedings of the 13th International Conference on Jetting Technology (pp. 91-103). Sardinia, Italy: October 29-31.
4. Petrenko O., (2006) Investigation of Formation and Development of High-Speed Liquid Projectiles. Department of Mechanical Engineering, *New Jersey Institute of Technology*, PhD Dissertation
5. Petrenko O., Geskin E., Goldenberg B., Samardzic V., Atanov G., Semko A., Kovaliov A., (2004), Numerical Modeling of Formation of High-Speed Water Slugs, *Transaction of ASME, Journal of Fluid Engineering*, March 2004, pp. 206-210.
6. Petrenko O., Geskin E., Rusanova O., Semko A., Bitardze T., (2005-a), Application of Numerical Techniques for Optimization of the Water Cannon Design, *Proceedings of Waterjet Technology Association Conference*, Editor M. Hashish, August, Houston, Tex.; paper 3A-1.
7. Petrenko O., Geskin E., Semko A. (2005-b), Mechanics of the Powder Hydro Cannon for Incompressible Fluids, *Ibid.,* 3B-3.
8. Chermensky, G. P., (1976-b). Experimental Investigation of Reliability of Water Cannons. *Proceedings of 3rd International Symposium on Jet Cutting Technology*, BHRA Fluid Engineering (pp. H1-1-H1-14). Chicago, USA.
9. Cooley, W. C., (1985). Computer Aided Engineering and Design of Cumulation Nozzles for Pulsed Liquid Jets. *Proceedings of the Third U.S. Water Jet Conference*, Pittsburgh, Pa.
10. Cooley, W. C., (1974). Fabrication and Testing of a Water Cannon for Rock Tunneling Experiments. *Department of Transportation*, Report No.: FRAORD&D 7438.
11. Edney, B. E., (1976). Experimental Studies of Pulsed Water Jets. *Proceedings of 3rd International Symposium on Jet Cutting Technology*, BHRA Fluid Engineering (pp. B2-11-B2-26). Chicago, USA
12. Kluz K., Geskin E., Petrenko O., (2007). Numerical Approximation of Propellant Driven Water Projectiles Launchers, Conference of the Waterjet Technology Association, Houston, Tex., August 2007
13. Glenn, L. A., (1974). On the dynamics of hypervelocity liquid jet impact on a flat rigid surface. *Zeitschrift für Angewandte Mathematike and Physik,* 25.
14. Pater, L. L., Borst P. H., (1983). An Extrusion-Type Pulsed Jet Device. *Proceedings of the Second U.S. Water Jet Conference*, Rolla, Mo.
15. Kollé J. J., (2005). Compressed Water Pulse Generators and Applications [Paper posted on *Tempress Technologies, INC.* Website]. Retrieved Jun. 15, 2007 from the World Wide Web: http://www.tempresstech.com/papers/water%20cannon.pdf
16. Voitsekhovsky B., (1965). Jet Nozzle for Obtaining High Pulse Dynamic Heads, U.S. Pat. No. 3,343,794

17. Samardzic V., (2007). Micro, Meso and Macro Materials Processing Using High Speed Water Projectiles. Department of Mechanical Engineering, *New Jersey Institute of Technology*, PhD Dissertation
18. Samardzic V., Geskin E. S, Atanov G., Semko A., Kovaliov A., (2007-a). Investigation of Metal Processing Using High Speed Liquid Impact, *Proceedings of Waterjet Technology Association Conference*, Houston, Tex., August 2007
19. Samardzic V., Geskin E. S., Atanov G. A., Semko A. N., Kovaliov A. V. (2007-c), Liquid Impact Based Material Micro Forming Technology; *Journal of Materials Engineering and Performance*, June, pp. 375-389
20. Samardzic V., Geskin E. S., Atanov G. A., Semko A. N., Kovaliov A. V., (2008), Investigation of Material Welding Using High Speed Liquid Impact, Journal of Materials Engineering and Performance, V. 17, N3, pp. 369-375, June.
21. Samardzic V., Kluz K., Petrenko O., Geskin E. S., Mazurkiewicz M., Berger A., (2007-d), Investigation of Granite Boring Using High Speed Liquid Impact, *Proceedings of Waterjet Technology Association Conference*, Houston, Tex., August 2007
22. Chermensky, G. P., (1976). Breaking Coal and Rocks with Pulsed Water Jets. *Proceedings of 3rd International Symposium on Jet Cutting Technology*, BHRA Fluid Engineering (pp. D4-33-D4-50), Chicago, USA.
23. Geskin E. S., (2008). High-Speed Liquid Projectiles: Efficient Energy Converging Tool, *Meeting the Entropy Challenge, American Institute of Physics*, Conference Proceedings 1033, pp. 322-329
24. Geskin E. S., Samardzic V., Petrenko O., Bitadze T., Atanov G., Semko A., Kovaliov A., Rusanova O., (2005). Feasibility Study of the Solid Freeform Fabrication of Heterogeneous Parts Using the Liquid Impact, *Proc. NSF DMII Grantees Conference*, Scottsdale, Ariz.
25. Geskin E. S., Petrenko O., (2006). Potential Applications of Supersonic Liquid Streams in Direct Steelmaking, *Proceedings of Sohn International Symposium in Advance Processing of Metals and Materials*, TMS, San Diego, V5, August
26. Geskin E., Petrenko O., Rusanova O., Semko A. (2006), Strength Analysis and Optimization of Barrel of Powder Water Cannon, *Strength of Material Vol.* 38, No 2. P. 206-213.

What is claimed is:

1. A tubular device comprising a section having a tube diameter greater than a diameter of an adjacent section, the section having a tube diameter greater than a diameter of an adjacent section comprising a minimum wall thickness less than a minimum wall thickness of the adjacent section, the tubular device formed by a process comprising providing a die having an interior cavity configured to receive a tubular workpiece, providing the die with an interior cavity having a dimension and shape corresponding to a desired shape of a the tubular device to be formed from the workpiece, providing a combustion chamber adjacent one end of the die and a tapered nozzle adjacent an opposite end of the die, providing the nozzle with a relief opening at an end thereof, positioning the combustion chamber, die and nozzle in axially alignment, inserting the workpiece having two opposing open ends in the die cavity in axial alignment with the combustion chamber, die and nozzle, loading a propellant charge in the combustion chamber, filling the workpiece with a liquid, and activating the propellant charge.

2. The device made according to claim 1 further comprising positioning an ignition mechanism adjacent to the combustion chamber and using the ignition mechanism to initiate a combustion event.

3. The device made according to claim 1 further comprising providing a continuous fluid supply to the apparatus.

4. The device made according to claim 1 comprising generating forming pressure reaching and/or exceeding 1 GPa.

5. The device made according to claim 1 wherein the device is a bleed tube for the compressor high pressure stage.

6. The device according to claim 1, the section having a tube diameter greater than a diameter of an adjacent section comprising a tube diameter from 12.29 to 55% greater than a diameter of the adjacent section.

7. The device according to claim 1, the section having a tube diameter greater than a diameter of an adjacent section comprising a cross sectional area 4.6% to 16.2% greater than a cross sectional area of the adjacent section.

8. The device according to claim 1 wherein the section having a tube diameter greater than a diameter of an adjacent section comprises a minimum wall thickness which is from 6% to 29.6% less than a wall thickness of the adjacent section.

9. The device according to claim 1 wherein the section having a tube diameter greater than a diameter of an adjacent section comprises a minimum wall thickness which is from 16.7% to 29.6% less than a wall thickness of the adjacent section.

10. The device according to claim 1 wherein the section having a tube diameter greater than a diameter of an adjacent section comprises a minimum wall thickness which is from 16.7% to 20% less than a wall thickness of the adjacent section.

11. The device according to claim 1 wherein the section having a tube diameter greater than a diameter of an adjacent section comprises a tube diameter greater than a diameter of a second adjacent section.

12. The device according to claim 1 wherein the tubular device is seamless.

* * * * *